United States Patent
Wang

(10) Patent No.: US 8,115,151 B2
(45) Date of Patent: Feb. 14, 2012

(54) LIGHT TRACKING SENSOR AND SUNLIGHT TRACKING SYSTEM THEREOF

(76) Inventor: Chengwei Wang, Beijing (CN)

( * ) Notice: Subject to any disclaimer, the term of this patent is extended or adjusted under 35 U.S.C. 154(b) by 563 days.

(21) Appl. No.: 11/921,691

(22) PCT Filed: Jun. 27, 2005

(86) PCT No.: PCT/CN2005/000932
§ 371 (c)(1),
(2), (4) Date: Feb. 19, 2009

(87) PCT Pub. No.: WO2006/131028
PCT Pub. Date: Dec. 14, 2006

(65) Prior Publication Data
US 2009/0235920 A1    Sep. 24, 2009

(30) Foreign Application Priority Data

Sep. 6, 2005 (CN) .......................... 2005 1 0034899
Sep. 6, 2005 (CN) .......................... 2005 1 0035034

(51) Int. Cl.
    *G01J 1/20* (2006.01)
(52) U.S. Cl. ............ 250/203.4; 250/227.11; 126/576
(58) Field of Classification Search ............. 250/203.4, 250/227.11; 126/573–578
See application file for complete search history.

(56) References Cited

U.S. PATENT DOCUMENTS

| | | | |
|---|---|---|---|
| 3,421,004 A | 1/1969 | Cashion | |
| 4,290,411 A | 9/1981 | Russell | |
| 4,362,931 A * | 12/1982 | Maruko et al. | 250/203.4 |
| 4,396,006 A | 8/1983 | Cross, Jr. | |
| 4,484,565 A | 11/1984 | Mori | |
| 4,495,408 A | 1/1985 | Mori | |
| 5,079,414 A * | 1/1992 | Martin | 250/203.3 |

(Continued)

FOREIGN PATENT DOCUMENTS

CN    2119614 U    10/1992

(Continued)

OTHER PUBLICATIONS

Supplementary European Search Report dated Feb. 28, 2011, issued in corresponding European Application No. 05757228.1.

*Primary Examiner* — Seung C Sohn
(74) *Attorney, Agent, or Firm* — Scully, Scott, Murphy & Presser, P.C.

(57) ABSTRACT

A light tracking sensor and a sunlight tracking system including the same, the light tracking sensor comprises two or more light tunnel devices. One end of the respective light tunnel devices form a common single-point micro-hole acting as an input port for directional light, the other ends of the light tunnel devices act as output ports for directional light and is provided with light-sensing units respectively. A sunlight tracking system is constituted of said light tracking sensor, a differential processing unit, an A/D converting unit, a microprocessor unit, a driving unit and an executive unit driven by the output end of the driving unit. Since one ends of the light tunnel devices form a common single-point micro-hole and the surface around the micro-hole is a curved surface, the sunlight tracking system, compared with the prior art, has a simpler structure, and a higher integration. Meanwhile, when in combination with certain software, a fast, accurate sunlight racking can be achieved, and its tracking precision is less influenced by the outdoor environment.

17 Claims, 3 Drawing Sheets

U.S. PATENT DOCUMENTS 6,363,928 B1 4/2002 Anderson, Jr.
6,465,766 B1 10/2002 Zhang

FOREIGN PATENT DOCUMENTS

| CN | 2205525 Y | 8/1995 |
| CN | 1349078 A | 5/2002 |
| CN | 2540601 Y | 3/2003 |
| CN | 2599483 Y | 1/2004 |
| CN | 2700775 Y | 5/2005 |
| JP | 61023368 | 1/1986 |
| JP | 01098912 | 4/1989 |
| JP | 7-043599 | 2/1995 |
| JP | 8-63232 | 3/1996 |

* cited by examiner

LIGHT TRACKING SENSOR AND SUNLIGHT TRACKING SYSTEM THEREOF

FIELD OF THE INVENTION

This invention relates to light sensing technology, and more particular, to a improved light tracking sensor suitable for sunlight tracking with smaller volume, higher sensor precision, and a sunlight tracking system having the same applicable for various solar-energy apparatus with smaller volume, higher precision and faster response.

DESCRIPTION OF THE RELATED ART

The utilization of solar-energy is the trend of the utilization of future clean energy for human being, and various solar-energy products were developed. However, the cost of the utilization of solar-energy at high temperature is high, prevents the utilization of solar-energy from popularity. If solar-energy cells can track the sun dynamically from time to time, the electric power generation capacity will be increased at least twice as much; for the utilization of solar-energy by a light-condensing reflector, if sunlight can be exactly followed from time to time, it is possible to create more significant high-temperature heat sources. To achieve sunlight tracking, a prior art sunlight tracker is comprised of two separate light tunnel devices unparallel to each other, each of which includes a light input port and a light output port provided with a sensor. According to the amount of sunlight energy received by the two sensors, a processor calculates the orientation angle of the sunlight. This kind of tracker has a larger volume, higher cost and harder manufacturing, and more vulnerable when exposed to outdoor environment in use. For example, if birds, insects, leaves, or rain drops enter one of the light tunnel devices, the measurement precision will be affected seriously. In practice, there are many limitations for energy utilization in solar-energy apparatus. For example, if solar-energy receiving elements receive sunlight in a fixed orientation without taking into consideration the orientation change of the sunlight, the solar-energy utilization ratio is low; if adjusted artificially, it is troubled with low efficiency; if adjusted automatically, a sunlight tracking system is needed. In prior art, there are following problems: it is difficult to balance the tracking performance, and the system cost and volume; the cost of tracking system is high; and the tracking precision and fast response are also undesirable. All of the above prevent the utilization of solar-energy from popularity.

SUMMARY OF THE INVENTION

To solve the above drawbacks of the light tracking sensors in prior art, the first object of the present invention is to provide a light tracking sensor with lower production cost, easier manufacturing, and higher measurement precision.

Another object of the present invention is to provide a sunlight tracking system with higher integration, faster response, lower cost, and higher precision.

The first object of the present invention is achieved by providing a light tracking sensor characterized in including two or more light tunnel devices, one end of the light tunnel devices being a common single-point micro-hole acting as an input port for directional light, the other ends of the light tunnel devices being output ports for directional light and being provided with light-sensing units respectively, and each of the light tunnel device being a directional light transmission device with a certain length.

In above light tracking sensors according to the present invention, there are two light tunnel devices unparallel to each other in a same plane with the input port of directional light as an apex, forming an angle between 0-180 degrees.

In above light tracking sensors according to the present invention, there are three light tunnel devices, any two of which forms a plane, so as to form totally three planes different from one another.

In above light tracking sensors according to the present invention, there are four light tunnel devices, in which two light tunnel devices being in one plane, and the other two being in another plane.

In above light tracking sensors according to the present invention, said directional light transmission device is constructed as a hollow tube with a circle or square or ellipse hollow section, and around the single-point micro-hole of said light tunnel device there is provided with a convex curved shell, and said light tunnel devices are formed integrally.

In above light tracking sensors according to the present invention, said light-sensing units are mounted on a circuit board together with the light tunnel devices.

In above light tracking sensors according to the present invention, a plurality of light-sensing units is integrally fixed to the ends of the respective light tunnel devices.

The first object of the present invention is achieved by providing a sunlight tracking system using above light tracking sensor according to the present invention, characterized in that said light-tracking sensor comprises two or more light tunnel devices, one end of the light tunnel devices being a common single-point micro-hole acting as an input port for directional light, the other ends of the light tunnel devices being output ports for directional light and being provided with light-sensing units respectively, and each of the light tunnel device being a directional light transmission device with a certain length; and further comprises a differential processing unit for amplifying the signals from said light-sensing units, an A/D converting unit for carrying out analog-digit convention of the signals output by said differential processing unit, a microprocessor unit having an input end connected with the output end of said A/D converting unit, a driving unit having an input end connected with the output end of said microprocessor unit, and an execrative unit driven by the output end of said driving unit.

In above sunlight tracking system according to the present invention, there are two said light tunnel devices unparallel to each other in a same plane with the input port for directional light as an apex, forming an angle between 5-170 degrees.

In above sunlight tracking system according to the present invention, the directional light transmission devices in said light tunnel devices are constructed as a hollow tube with a circle or square or ellipse hollow section.

In above sunlight tracking system according to the present invention, the inner wall of the hollow tube configuration of said light tunnel device is provided with a light-absorbing layer.

In above sunlight tracking system according to the present invention, around the single-point micro-hole of said light tunnel device there is provided with a convex curved shell, and said light tunnel devices are formed integrally.

In above sunlight tracking system according to the present invention, light-sensing units and light tunnel devices are mounted in a same module together with the differential processing unit, A/D converting unit, microprocessor unit and driving unit.

In above sunlight tracking system according to the presenting version, a plurality of light-sensing units is integrally fixed to the ends of respective light tunnel devices.

In above sunlight tracking system according to the presenting version, the output end of said driving unit is connected with a steering motor for controlling orientations, and said sunlight tracking system is mounted on a solar-energy apparatus controlled by said steering motor to follow sunlight.

In above sunlight tracking system according to the presenting version, the output end of said driving unit drives an actuator motor through a relay or a power-driver module for adjusting the action of a solar-energy apparatus, and said sunlight tracking system is mounted on a solar-energy apparatus under the control of said actuator motor to follow sunlight.

In above sunlight tracking system according to the presenting version, said driving unit includes a MOSFET driving circuit.

The advantages of the present invention are: since one ends of the light tunnel devices of a light tracking sensor form a common single-point micro-hole, the whole apparatus has a simpler configuration and easier for manufacturing; since the light tracking sensor of present invention is provided with curved top surface to help water falling, it is less influenced by the outdoor environment, thus the measurement precision is increased; and since a plurality of light tunnel devices can be formed integrally by way of moulding, erosion, photolithography, less procedures for manufacturing and smaller volume are required, and it is more convenient to be widely used.

Since one end of the light tunnel devices used in light sensing is a common single-point micro-hole and the surface around the micro-hole is a convex curved surface, the sunlight tracking system based on the sensor according to the present invention, compared to the prior art, has a simpler configuration and a higher integration; meanwhile, when in combination with certain software, a fast, accurate sunlight tracking can be achieved, and its measurement precision is less influenced by the outdoor environment.

BRIEF DESCRIPTION OF THE DRAWINGS

The present invention will become more apparent and more readily appreciated from the following description of the embodiments, taken in conjunction with the drawings, in the drawings.

DETAILED DESCRIPTION OF THE REFERENCED EMBODIMENTS

Figure 1:
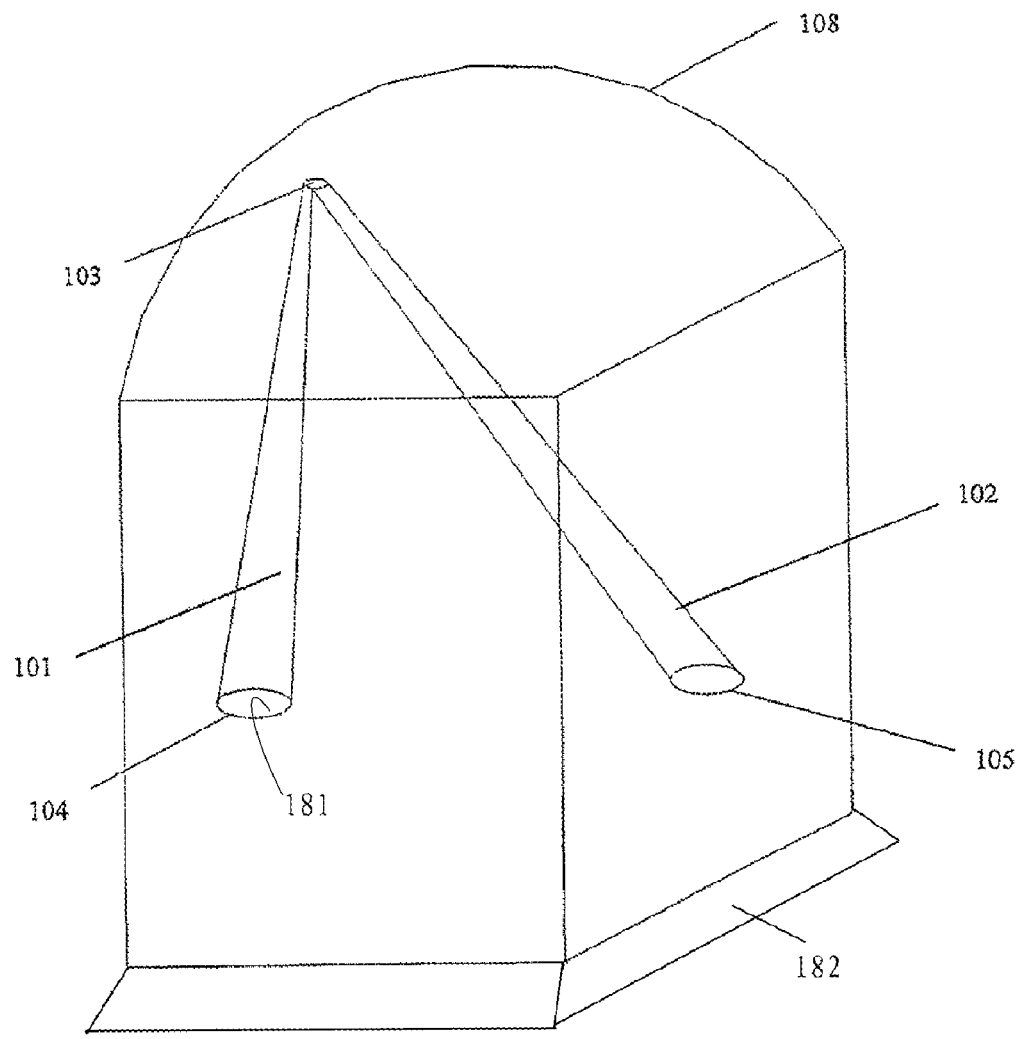
FIG. 1 is a schematic view of the external configuration of a light tracking sensor and a sunlight tracking system including the same according to the present invention.

The light tracking sensor of the present invention is applicable to a solar-energy heating system with a light-condensing groove-type reflector, also to a solar-energy system with a medium and high-temperature light-condensing disk-type reflector, and further to a solar-energy photovoltaic electric power generation system. As shown in FIG. 1, a sunlight tracking system with the light tracking sensor according to the present invention comprises two light tunnel devices 101 and 102 with a certain length, which combine together at one end so as to form a common single-point micro-hole 103 acting as an input port for the directional light. The other ends of the light tunnel devices 101 and 102 act as output ports 104 and 105 for the directional light respectively, at which a light-sensing unit, for example a photodiode, is provided.

Figure 2:
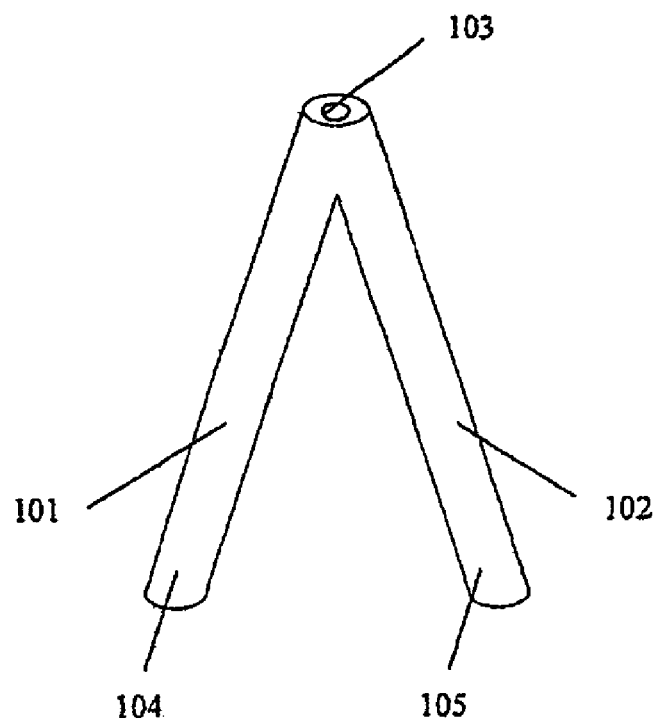
FIG. 2 is a schematic view of the configuration of a light tunnel device according to an embodiment of the present invention.

FIG. 2 is a schematic view of the configuration of a light tunnel device of a light tracking sensor according to an embodiment of the present invention. As shown in FIG. 2, there are two light tunnel devices 101 and 102, which are not parallel to each other in a same plane to form an angle between 0 and 180 degrees. The two light tunnel devices 101 and 102 combine together at one end so as to form a common single-point micro-hole 103 acting as an input port for the directional light, and the other ends of the light tunnel devices act as output ports 104 and 105 respectively for the directional light transmitted through the two light tunnel devices. Here, the light tunnel devices 101 and 102 are transmission devices for the directional light with a certain length, in which the hollow section is in the shape of a circle or square or ellipse. A plurality of light tunnel devices can be formed integrally. Light-sensing units 106 and 107 (not shown) disposed at output ports 104 and 105 can be fixed integrally at the ends of the respective light tunnel devices. Such configuration can be accomplished by way of photolithography, or by way of combining. The size of input port 103 for incident directional light can be slightly smaller than that of output ports 104 and 105. To reduce the transmission error of directional light in light tunnel devices, a light-absorbing layer 181 can be provided on the peripheral wall surfaces inside the light tunnel devices, aiming at reducing the influence of reflection or refraction of the peripheral wall surfaces on the detection of the light-sensing units.

Figure 3:
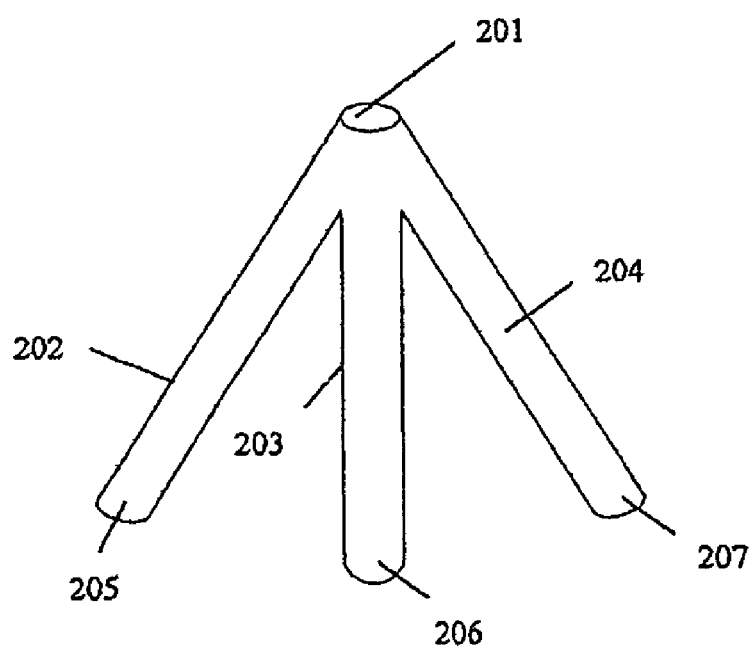
FIG. 3 is a schematic view of the configuration of a light tunnel device of a light tracking sensor according to a second embodiment of the present invention.

FIG. 3 is a schematic view of the configuration of a light tunnel device of light tracking sensor according to a second embodiment of the present invention. As shown in FIG. 3, there are three light tunnel devices 202-204, each two of which constitute one plane different from the other two planes. The three light tunnel devices combine at one end so as to form a common single-point micro-hole 201 acting as a common input port for directional light incident on the three light tunnel devices 202-204, and the other ends of three light tunnel devices 202-204 act as output ports 205-207 respectively for directional light incident on the three light tunnel devices.

The configuration of the second embodiment is more complicated than that of the first embodiment, but has a higher measurement precision and, at the same time, more complex calculation procedure. Additionally, the three light tunnel devices can be disposed in a same plane, with a simpler configuration and smaller volume.

Figure 4:
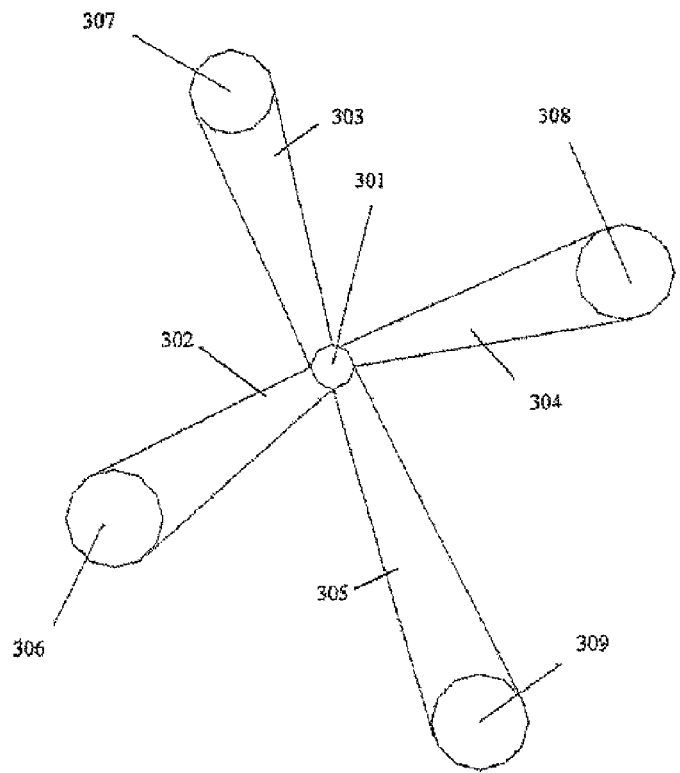
FIG. 4 is a schematic view of the configuration of a light tunnel device of a light tracking sensor according to a third embodiment of the present invention.

FIG. 4 is a schematic top view of the configuration of a light tunnel device of a light tracking sensor according to a third embodiment of the present invention. As shown in FIG. 4, there are four light tunnel devices 302-305, two of which are in one plane and the other two are in another plane. The four light tunnel devices combine at one end so as to form a common single-point micro-hole 301 acting as an input port for directional light incident on the four light tunnel devices 302-305, and the other ends of four light tunnel device 302-305 act as output ports 306-309 respectively for directional light incident on the light tunnel devices.

The configuration of this embodiment is relatively more complicated, but has a higher measurement precision. Additionally, all of, or three of the light tunnel devices can be disposed in a same plane.

As shown in FIG. 1, in a light tracking sensor and a sensing tracking system including the same according to an embodiment of the present invention, there are two light tunnel devices 101 and 102 with a certain length. The two light tunnel devices 101 and 102 combine together at one end so as to form a common single-point micro-hole 103 acting as an input port for the directional light, and the other ends of the light tunnel devices act as output ports 104 and 105 respectively for the directional light transmitting through the two light tunnel devices, at which light-sensing units 106 and 107, for example photo diodes, are disposed (see FIG. 2). The light tunnel devices can be enclosed in a shell 108, only the single-point micro-hole 103 being exposed on the upper surface. Around the hole a convex curved shell is provided, and preferably the single-point micro-hole 103 is not disposed at the apex of the shell, aiming at preventing foreign substance, such as leaves, rain and dust from entering the input port 103 and being caught there. The light-sensing units and the light tunnel devices may be mounted on a circuit board 182. Additionally, a transparent dustproof film may be provided to cover the single-point micro-hole 103.

This sunlight tracking system is applicable to a solar-energy heating system with a light-condensing groove-type reflector, also to a solar-energy system with a medium and high-temperature light-condensing disk-type reflector, and further to a solar-energy photovoltaic electric power generation system, or other solar-energy systems.

Figure 5:
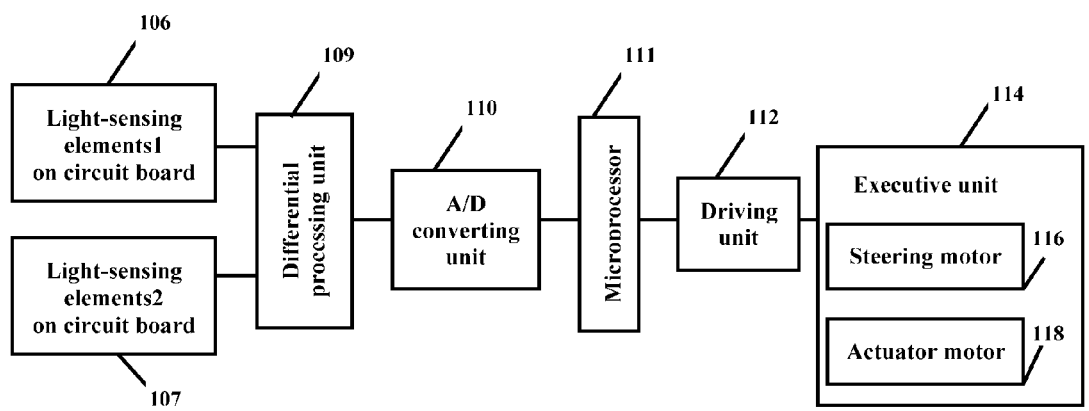
FIG. 5 is a logic diagram of a sunlight tracking system according to the present invention.

FIG. 5 is a logic diagram of a sunlight tracking system according to the present invention. As shown in FIG. 5, it can be seen that the sunlight tracking system of the present invention schematically includes two light-sensing units 106 and 107, such as photodiodes. As shown in FIG. 2, two light tunnel devices 101 and 102 combine together at one end so as to form a common single-point micro-hole 103 acting as an input port for the directional light, and the other ends of the light tunnel devices act as output ports 104 and 105 respectively for the directional light incident on the light tunnel devices, at which light-sensing units 106 and 107 are disposed. The electric signals from two light-sensing units 106 and 107 are transmitted to a signal input end of differential processing unit 109, the signals output by the differential processing unit 109 is analog-to-digital converted by an A/D converting unit 110, the signals output by the A/D converting unit 110 is processed by a microprocessor unit 111 according to certain algorithm, and a driving unit 112 is connected to the output end of the microprocessor unit at the input end to drive an executing unit 114, such as a motor, at the output end. To reduce the volume, all of the above components, i.e. the light-sensing units 106, 107, the light tunnel devices 101, 102, the differential processing unit 109, A/D converting unit 110, microprocessor unit 111 and driving unit 112 can be mounted in a single modular assembly. Here, the output end of the driving unit is connected with a steering motor 116 for controlling orientations, and the sunlight tracking system is mounted on a solar-energy apparatus driven by the steering motor to follow sunlight. Or, the output end of the driving unit may be connected with an actuator motor 118 for actuating the solar-energy apparatus through a relay or a power-driver module, and the sunlight tracking system is mounted on the solar-energy apparatus actuated by the actuator motor.

The invention claimed is:

1. A light tracking sensor comprising two or more light tunnel devices, one end of the respective light tunnel devices being a common single-point micro-hole acting as an input port for directional light, the other ends of the light tunnel devices being output ports for directional light and being provided with light-sensing units, respectively, and each of the light tunnel devices being a directional light transmission device with a certain length.

2. The light-tracking sensor according to claim 1, wherein there are two light tunnel devices unparallel to each other in a same plane, forming an angle between 0-180 degrees with the input port for directional light being an apex.

3. The light-tracking sensor according to claim 1, wherein there are three light tunnel devices, any two of which forms a plane, so as to form totally three planes different from one another.

4. The light-tracking sensor according to claim 1, wherein there are four light tunnel devices, in which two light tunnel devices are in one plane, while the other two are in another plane.

5. The light-tracking sensor according to claim 1, wherein said directional light transmission device is constructed as a hollow tube with a circle or square or ellipse hollow section, and around the single-point micro-hole of said light tunnel devices there is provided with a convex curved shell, and said light tunnel devices are formed integrally.

6. The light-tracking sensor according to claim 1, wherein said light-sensing units and the light tunnel devices are mounted on a circuit board.

7. The light-tracking sensor according to claim 1, wherein a plurality of light-sensing units are integrally fixed to the ends of the respective light tunnel devices.

8. A sunlight tracking system comprising a light tracking sensor, wherein:
said light tracking sensor comprises two or more light tunnel devices, one end of the respective light tunnel devices being a common single-point micro-hole acting as an input port for directional light, the other ends of the light tunnel devices being output ports for directional light and being provided with light-sensing units, respectively, and each of the light tunnel devices being a directional light transmission device with a certain length; and
said light tracking sensor further comprises a differential processing unit for amplifying the signals from said light-sensing units, an A/D converting unit for carrying out analog-digit converting of the signals output by said differential processing unit, a microprocessor unit having an input end connected with the output end of said A/D converting unit, a driving unit having an input end connected with the output end of said microprocessor unit, and an executive unit driven by the output end of said driving unit.

9. The sunlight tracking system according to claim 8, wherein there are two light tunnel devices unparallel to each other in a same plane, forming an angle between 5-170 degrees with the input port for directional light being an apex.

10. The sunlight tracking system according to claim 8, wherein said directional light transmission device in said light tunnel device is constructed as a hollow tube with a circle or square or ellipse hollow section.

11. The sunlight tracking system according to claim 10, wherein the inner wall of the hollow tube configuration of said light tunnel device is provided with a light-absorbing layer.

12. The sunlight tracking system according to claim 8, wherein, around the single-point micro-hole of said light tunnel device, there is provided with a convex curved shell, and said light tunnel devices are formed integrally.

13. The sunlight tracking system according to claim 8, wherein the light-sensing units and light tunnel devices are mounted in a same module together with the differential processing unit, A/D converting unit, microprocessor unit and driving unit.

14. The sunlight tracking system according to claim 8, wherein a plurality of light-sensing units are integrally fixed to the ends of respective light tunnel devices.

15. The sunlight tracking system according to claim 8, wherein the output end of said driving unit is connected with a steering motor for controlling orientations, and the sunlight tracking system is mounted on a solar-energy apparatus driven by the steering motor to follow sunlight.

16. The sunlight tracking system according to claim 8, wherein the output end of said driving unit drives an actuator motor through a relay or a power-driver module for adjusting the action of a solar-energy apparatus, and said sunlight tracking system is mounted on a solar-energy apparatus actuated by the actuator motor to follow sunlight.

17. The sunlight tracking system according to claim 8, wherein said driving unit includes a MOSFET driving circuit.

* * * * *